(12) United States Patent
Noda et al.

(10) Patent No.: US 12,071,985 B2
(45) Date of Patent: Aug. 27, 2024

(54) CLUTCH ACTUATOR

(71) Applicant: DENSO CORPORATION, Kariya (JP)

(72) Inventors: Hirohisa Noda, Kariya (JP); Ryo Ishibashi, Kariya (JP); Akira Takagi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/532,909

(22) Filed: Dec. 7, 2023

(65) Prior Publication Data

US 2024/0102517 A1 Mar. 28, 2024

Related U.S. Application Data

(63) Continuation of application No. PCT/JP2022/024318, filed on Jun. 17, 2022.

(30) Foreign Application Priority Data

Jun. 30, 2021 (JP) ................................. 2021-108818
Jan. 31, 2022 (JP) ................................. 2022-013265

(51) Int. Cl.
*F16D 23/12* (2006.01)
*F16D 28/00* (2006.01)

(52) U.S. Cl.
CPC ............. *F16D 23/12* (2013.01); *F16D 28/00* (2013.01); *F16D 2023/123* (2013.01)

(58) Field of Classification Search
CPC .... F16D 23/12; F16D 2023/123; F16D 13/52; F16H 13/08; F16H 57/027; F16H 57/029;
(Continued)

(56) References Cited

U.S. PATENT DOCUMENTS

| 9,242,636 | B2 * | 1/2016 | Helmer | .................. | F16D 23/12 |
| 2005/0205377 | A1 * | 9/2005 | Borgerson | .............. | F16D 28/00 |
| | | | | | 192/48.92 |

(Continued)

FOREIGN PATENT DOCUMENTS

| JP | S5515403 U | 1/1980 |
| JP | 2009006808 A | 1/2009 |

(Continued)

OTHER PUBLICATIONS

Machine translation of JP 2017034880 A (Year: 2017).*

(Continued)

*Primary Examiner* — Jacob S. Scott
*Assistant Examiner* — Farhana Pervin
(74) *Attorney, Agent, or Firm* — Nixon & Vanderhye P.C.

(57) ABSTRACT

A housing is placed at an inside space of a case to be installed on a vehicle. The housing includes: a housing plate portion configured to contact a case plate portion of the case; and a receiving space located on one side of the housing plate portion which is opposite to the case plate portion. An electric motor is placed at the receiving space and is configured to output a torque. The housing includes: a housing ventilation hole that extends through the housing plate portion and communicates between an outside space of the housing and the receiving space; and a breathable filter that is placed on a side of the housing ventilation hole, at which the case plate portion is placed, to cover the housing ventilation hole, while the breathable filter is configured to permit a gas to pass through the breathable filter.

11 Claims, 5 Drawing Sheets

(58) Field of Classification Search
CPC ............. F16H 57/0412; F16H 57/0416; F16H 57/0424; H02K 7/06; H02K 7/11
See application file for complete search history.

(56) References Cited

U.S. PATENT DOCUMENTS

| | | | |
|---|---|---|---|
| 2015/0144453 A1* | 5/2015 | Larkin | B60K 17/35 |
| | | | 192/84.7 |
| 2018/0087640 A1* | 3/2018 | Numabe | B60K 17/165 |
| 2020/0323088 A1 | 10/2020 | Atsumi et al. | |
| 2022/0128102 A1 | 4/2022 | Uchida et al. | |
| 2022/0136568 A1 | 5/2022 | Hayashi et al. | |
| 2022/0145939 A1 | 5/2022 | Takagi et al. | |
| 2022/0145940 A1 | 5/2022 | Ishibashi et al. | |
| 2022/0145941 A1 | 5/2022 | Sugiura et al. | |
| 2022/0145942 A1 | 5/2022 | Hayashi et al. | |
| 2022/0145943 A1 | 5/2022 | Uchida et al. | |
| 2022/0145944 A1 | 5/2022 | Sugiura | |
| 2022/0145945 A1 | 5/2022 | Sugiura | |
| 2022/0145946 A1 | 5/2022 | Ishibashi et al. | |

FOREIGN PATENT DOCUMENTS

| | | |
|---|---|---|
| JP | 2017034880 A | 2/2017 |
| JP | 2018155361 A | 10/2018 |
| JP | 2021005973 A | 1/2021 |
| WO | 2023276722 A1 | 1/2023 |
| WO | 2023276727 A1 | 1/2023 |
| WO | 2023276728 A1 | 1/2023 |

OTHER PUBLICATIONS

U.S. Appl. No. 18/531,105 to Takumi Sugiura et al., filed Dec. 6, 2023 (72 pages).
U.S. Appl. No. 18/530,401 to Tomonori Suzuki et al., filed Dec. 6, 2023 (54 pages).
U.S. Appl. No. 18/529,797 to Tomonori Suzuki, filed Dec. 5, 2023 (52 pages).
U.S. Appl. No. 18/529,797, filed Dec. 5, 2023, Clutch Actuator and Method for Manufacturing Same.
U.S. Appl. No. 18/531,105, filed Dec. 6, 2023, Geared Motor and Clutch Actuator Using Same.
U.S. Appl. No. 18/530,401, filed Dec. 6, 2023, Clutch Actuator.
U.S. Appl. No. 18/532,909, filed Dec. 7, 2023, Clutch Actuator.

* cited by examiner

CLUTCH ACTUATOR

CROSS REFERENCE TO RELATED APPLICATIONS

This application is a continuation application of International Patent Application No. PCT/JP2022/024318 filed on Jun. 17, 2022, which designated the U.S. and claims the benefit of priority from Japanese Patent Application No. 2021-108818 filed on Jun. 30, 2021 and Japanese Patent Application No. 2022-013265 filed on Jan. 31, 2022. The entire disclosures of all of the above applications are incorporated herein by reference.

TECHNICAL FIELD

The present disclosure relates to a clutch actuator.

BACKGROUND

A clutch actuator capable of shifting a state of a clutch has been previously proposed. The clutch is installed between a first transmission element and a second transmission element which can make relative rotation therebetween, and the state of the clutch is shiftable between: a coupled state where transmission of a torque between the first transmission element and the second transmission element is enabled; and a decoupled state where the transmission of the torque between the first transmission element and the second transmission element is blocked. Also known as this type of clutch actuator is a clutch actuator that has components, such as an electric motor, received in a receiving space of a housing.

SUMMARY

According to the present disclosure, there is provided a clutch actuator for a clutch device that includes a clutch installed between a first transmission element and a second transmission element, which are configured to make relative rotation between the first transmission element and the second transmission element, while the clutch is configured to shift a state between: a coupled state where transmission of a torque between the first transmission element and the second transmission element is enabled; and a decoupled state where the transmission of the torque between the first transmission element and the second transmission element is blocked. The clutch actuator includes a housing, an electric motor and a rotation-to-translation converter. The housing is placed at an inside space of a case which is configured to be installed on a vehicle. The housing includes a housing plate portion and a receiving space. The housing plate portion is configured to contact a case plate portion of the case. The receiving space is located on one side of the housing plate portion which is opposite to the case plate portion. The electric motor is placed at the receiving space and is configured to output a torque of rotation in response to supply of an electric power to the electric motor. The rotation-to-translation converter is configured to convert a rotating motion, which is generated by the torque transmitted from the electric motor, into a translating motion to shift the state of the clutch to the coupled state or the decoupled state. The housing includes a housing ventilation hole and a breathable filter. The housing ventilation hole extends through the housing plate portion and communicates between an outside space of the housing and the receiving space. The breathable filter is placed on a side of the housing ventilation hole, at which the case plate portion is placed, to cover the housing ventilation hole, wherein the breathable filter is configured to permit a gas to pass through the breathable filter.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

A clutch actuator capable of shifting a state of a clutch has been previously proposed. The clutch is installed between a first transmission element and a second transmission element which can make relative rotation therebetween, and the state of the clutch is shiftable between: a coupled state where transmission of a torque between the first transmission element and the second transmission element is enabled; and a decoupled state where the transmission of the torque between the first transmission element and the second transmission element is blocked. Also known as this type of clutch actuator is a clutch actuator that has components, such as an electric motor, received in a receiving space of a housing.

By the way, there has been also proposed a transmission control unit that is placed in an environment where the transmission control unit is likely to be exposed to transmission oil received at an inside of the transmission. This transmission control unit includes: a case that is made of resin and forms an inside space between the case and a base made of metal; a printed circuit board and electronic components that are received in the inside space; and a connector that is formed integrally with the case and projects to an outside of a transmission case. The inside space, which receives the electronic components, is kept gas-tight or liquid-tight by an oil-tight seal member. The connector has a ventilation hole that communicates between this inside space and an outside space of the transmission case to limit a change in a pressure of the inside space caused by a temperature change.

In the previously proposed transmission control unit, in the connector made of the resin, the ventilation hole is relatively long and extends in two directions, i.e., is bent. This may complicate a process of resin molding of the connector.

Furthermore, the previously proposed transmission control unit described above includes: a breathable filter that is installed to close the ventilation hole; and a cover that limits detachment of the breathable filter. Therefore, the connector needs to have a portion to which the cover is installed. Furthermore, there is required an assembling work for assembling the breathable filter and the cover to the connector. This may possibly result in an increase in the number of components, an increase in the number of working steps, and an increase in complexity of the structure.

If the structure, which relates to the ventilation hole of the previously proposed transmission control unit described above, is applied to the clutch actuator to limit the change in the pressure of the receiving space of the housing of the clutch actuator, the disadvantages described above may possibly occur.

According to the present disclosure, there is provided a clutch actuator for a clutch device that includes a clutch installed between a first transmission element and a second transmission element, which are configured to make relative rotation between the first transmission element and the second transmission element, while the clutch is configured to shift a state between: a coupled state where transmission of a torque between the first transmission element and the second transmission element is enabled; and a decoupled state where the transmission of the torque between the first transmission element and the second transmission element is blocked. The clutch actuator includes a housing, an electric motor and a rotation-to-translation converter.

The housing is placed at an inside space of a case which is configured to be installed on a vehicle. The housing includes: a housing plate portion that is configured to contact a case plate portion of the case; and a receiving space that is located on one side of the housing plate portion which is opposite to the case plate portion. The electric motor is placed at the receiving space and is configured to output a torque of rotation in response to supply of an electric power to the electric motor.

The rotation-to-translation converter is configured to convert a rotating motion, which is generated by the torque transmitted from the electric motor, into a translating motion to shift the state of the clutch to the coupled state or the decoupled state. The housing includes: a housing ventilation hole that extends through the housing plate portion and communicates between an outside space of the housing and the receiving space; and a breathable filter that is placed on a side of the housing ventilation hole, at which the case plate portion is placed, to cover the housing ventilation hole, while the breathable filter is configured to permit a gas to pass through the breathable filter.

According to the present disclosure, the housing ventilation hole can limit a change in a pressure of the receiving space caused by a temperature change. Furthermore, even in a case where the clutch actuator is placed in an environment, such as the inside space of the transmission case, where the clutch actuator may possibly be exposed to the liquid, such as the transmission oil, the breathable filter can limit the liquid from entering the receiving space through the housing ventilation hole. Furthermore, when the breathable filter is placed on the side of the housing ventilation hole, at which the case plate portion is placed, i.e., when the breathable filter is clamped between the housing plate portion and the case plate portion, detachment of the breathable filter can be limited without a need for providing an additional component such as a cover. This can limit an increase in the number of components, an increase in the number of working steps, and an increase in complexity of the structure.

Hereinafter, a plurality of embodiments of a clutch actuator will be described with reference to the drawings. The same reference signs are given to substantially the same portions among the embodiments, and the redundant description thereof will be omitted for the sake of simplicity.

First Embodiment

Figure 1:
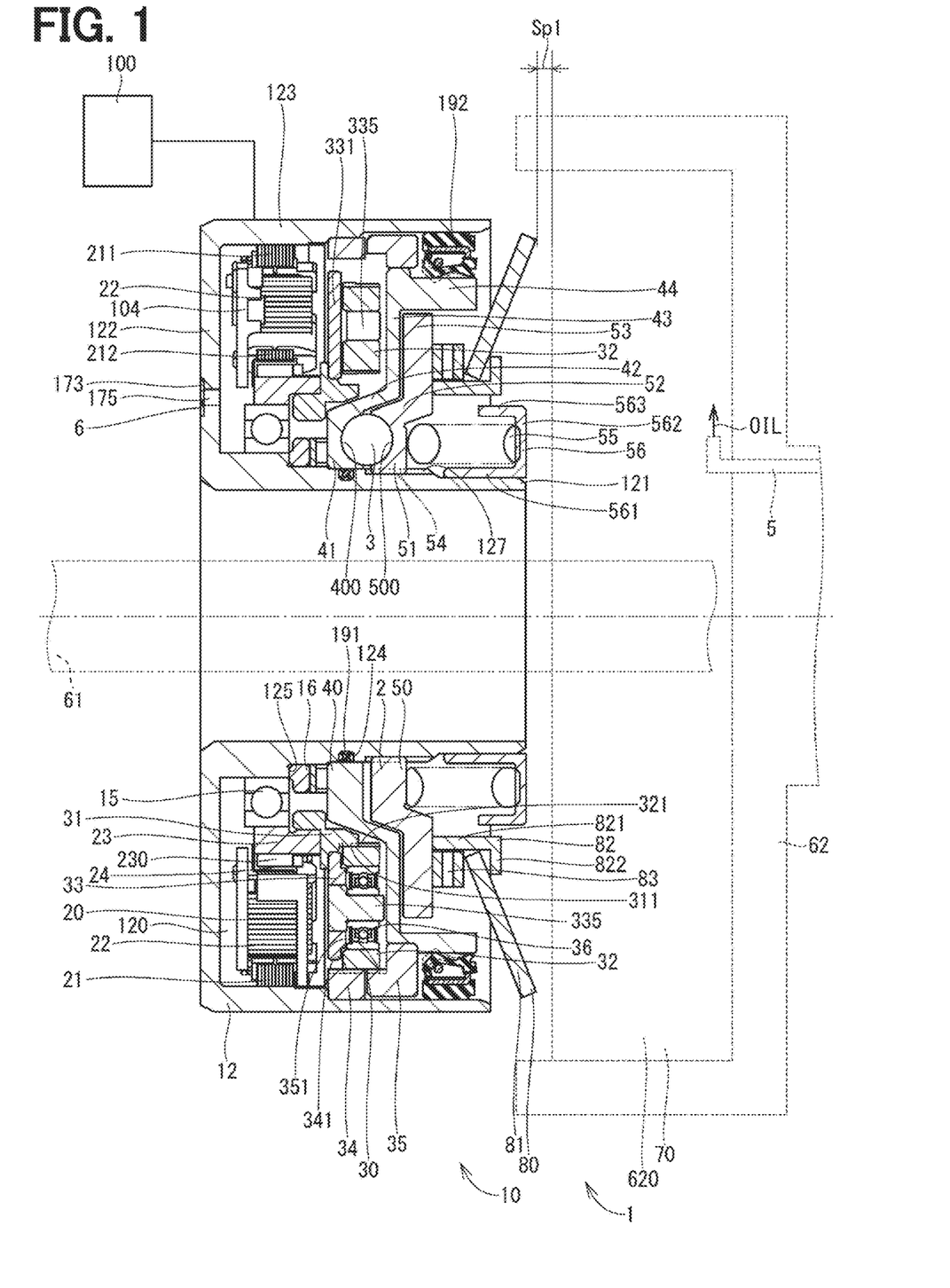
FIG. 1 is a cross-sectional view showing a clutch actuator and a clutch device having the clutch actuator according to a first embodiment.
Figure 2:
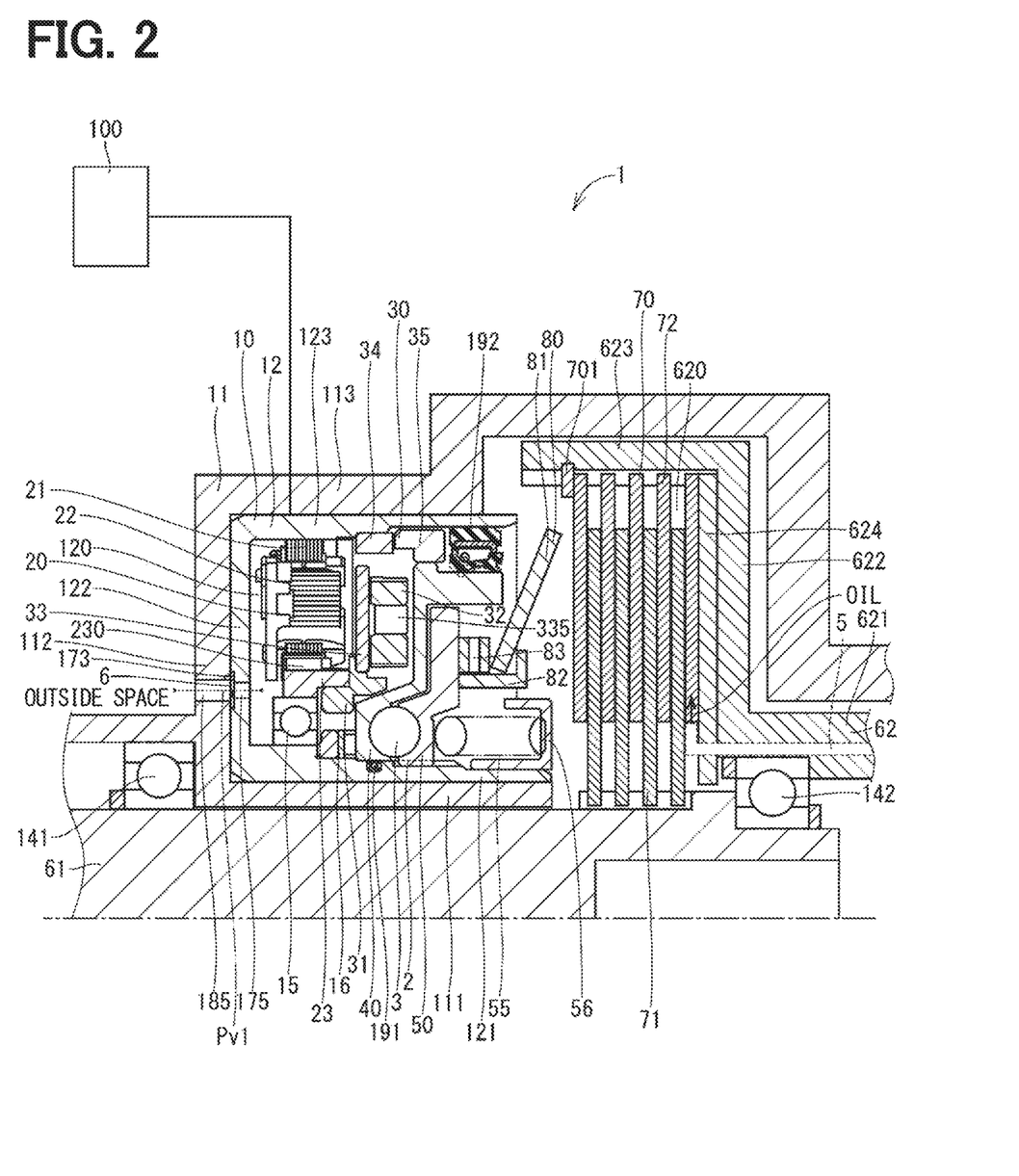
FIG. 2 is a cross-sectional view showing a portion of the clutch actuator and a portion of the clutch device according to the first embodiment.

FIGS. 1 and 2 show a clutch device to which a clutch actuator of a first embodiment is applied. The clutch device 1 is installed between, for example, an internal combustion engine and a transmission of a vehicle to enable or disable transmission of a torque between the internal combustion engine and the transmission.

The clutch device 1 includes: a clutch actuator 10; a clutch 70; an electronic control unit (hereinafter referred to as ECU) 100, which serves as a controller unit; an input shaft 61, which serves as a first transmission element; and an output shaft 62, which serves as a second transmission element.

The clutch actuator 10 includes: a housing 12; an electric motor 20, which serves as a prime mover; a rotor bearing 15; a speed reducer 30; a torque cam 2, which serves as a rotation-to-translation converter or a rolling-element cam; a thrust bearing 16; and a state shifter 80. The clutch actuator 10 is installed at an inside space of, for example, a transmission case 11.

The transmission case 11 is installed on the vehicle and receives the transmission. Here, the transmission case 11 serves as a case.

The ECU 100 is a small computer that has a CPU (serving as a computing unit), a ROM and a RAM (serving as a storage unit) and an input/output device (serving as an input/output unit). The ECU 100 performs calculations based on information (e.g., signals from various sensors installed in various parts of the vehicle) and controls operations of various devices and equipment of the vehicle according to a program(s) stored in, for example, the ROM. As described above, the ECU 100 executes the program(s) stored in the non-transitory tangible storage medium. When the program is executed, a method, which corresponds to the program, is executed.

The ECU 100 is configured to control the operation of the internal combustion engine and the like according to the information (e.g., the signals from the various sensors). Furthermore, the ECU 100 is also configured to control the operation of the electric motor 20 described later.

The input shaft 61 is connected to, for example, a drive shaft (not shown) of the internal combustion engine and is rotatable integrally with the drive shaft. That is, a torque is inputted to the input shaft 61 from the drive shaft.

The transmission case 11 is securely mounted, for example, in an engine compartment of the vehicle. A ball bearing 141 is installed between an inner wall of the transmission case 11 and an outer peripheral wall of the input shaft 61. Therefore, the input shaft 61 is rotatably supported by the transmission case 11 through the ball bearing 141.

The housing 12 is placed on a radially outer side of the input shaft 61 at the inside space of the transmission case 11 such that an outer wall of the housing 12 contacts an inner wall of the transmission case 11. The housing 12 includes a housing inner tubular portion (serving as a housing tubular portion) 121, a housing plate portion 122, a housing outer tubular portion 123, a seal groove 124, a housing step surface 125, and a plurality of housing-side spline grooves 127.

The housing inner tubular portion 121 is shaped generally in a cylindrical tubular form. The housing plate portion 122 is shaped in an annular plate form such that the housing plate portion 122 radially outwardly extends from an end portion of the housing inner tubular portion 121. The housing outer tubular portion 123 is shaped generally in a cylindrical tubular form such that the housing outer tubular portion 123 extends from an outer periphery of the housing plate portion 122 toward the same axial side as the housing inner tubular portion 121. Here, the housing inner tubular portion 121, the housing plate portion 122 and the housing outer tubular portion 123 are formed integrally in one-piece from, for example, metal.

As described above, the housing 12 is hollow and flattened as a whole.

The seal groove 124 is shaped in an annular form (i.e., a ring form) such that the seal groove 124 is recessed from an outer peripheral wall of the housing inner tubular portion 121 toward the radially inner side. The housing step surface 125 is formed as a circular annular flat surface and is placed between the seal groove 124 and the housing plate portion 122 and faces toward an axial side that is opposite to the housing plate portion 122.

The housing-side spline grooves 127 are formed at the outer peripheral wall of the housing inner tubular portion 121 such that the housing-side spline grooves 127 extend in the axial direction of the housing inner tubular portion 121. The housing-side spline grooves 127 are arranged one after another in a circumferential direction of the housing inner tubular portion 121.

The housing 12 is fixed to the transmission case 11 such that an outer wall of the housing 12 contacts a portion of the inner wall of the transmission case 11 (see FIG. 2). The housing 12 is fixed to the transmission case 11 by, for example, bolts (not shown). The housing 12 is coaxial with the transmission case 11 and the input shaft 61. Here, "coaxial" is not limited to a coaxial state in which two axes are strictly coincident but may include a state in which the two axes are slightly deviated from each other or are tilted relative to each other (this is also true for the following description).

The housing 12 has a receiving space (serving as a space) 120. The receiving space 120 is formed by the housing inner tubular portion 121, the housing plate portion 122 and the housing outer tubular portion 123.

Details of the structures of the housing 12 and the transmission case 11 will be described later.

The electric motor 20 is received in the receiving space 120. The electric motor 20 includes a stator 21, a plurality of coils 22, a rotor 23, a plurality of magnets (serving as permanent magnets) 230 and a magnet cover 24.

The stator 21 includes a stator yoke 211 and a plurality of stator teeth 212. The stator 21 is formed by, for example, a plurality of laminated steel sheets. The stator yoke 211 is shaped generally in a cylindrical tubular form. The stator teeth 212 are formed integrally with the stator yoke 211 such that the stator teeth 212 radially inwardly project from an inner peripheral wall of the stator yoke 211. The stator teeth 212 are arranged at equal intervals in the circumferential direction of the stator yoke 211. The coils 22 are respectively wound to the stator teeth 212. The stator 21 is fixed to the housing 12 such that an outer peripheral wall of the stator yoke 211 is fitted to an inner peripheral wall of the housing outer tubular portion 123.

The rotor 23 is made of, for example, iron-based metal. The rotor 23 includes a rotor main body 231 and a rotor tubular portion 232. The rotor main body 231 is shaped generally in a circular annular form (i.e., a circular ring form). The rotor tubular portion 232 extends in a tubular form from an outer periphery of the rotor main body 231.

The magnets 230 are arranged along an outer peripheral wall of the rotor 23. The magnets 230 are arranged at equal intervals in a circumferential direction of the rotor 23 such that magnetic poles of the magnets 230 are alternately arranged in the circumferential direction to alternately have opposite polarities.

The magnet cover 24 is installed to the rotor 23 such that the magnet cover 24 covers outer surfaces of the magnets 230, which are located on the radially outer side in the radial direction of the rotor 23. More specifically, the magnet cover 24 is made of, for example, a non-magnetic metal material.

The clutch actuator 10 includes the rotor bearing 15. On a side of the housing step surface 125 where the housing plate portion 122 is placed, the rotor bearing 15 is installed on a radially outer side of the housing inner tubular portion 121.

The rotor bearing 15 is installed to the housing inner tubular portion 121 in a state where an inner peripheral wall of an inner race of the rotor bearing 15 contacts the outer peripheral wall of the housing inner tubular portion 121. The rotor 23 is installed such that an inner peripheral wall of the rotor main body 231 is fitted to an outer peripheral wall of an outer race of the rotor bearing 15. In this way, the rotor bearing 15 supports the rotor 23 such that the rotor 23 is rotatable relative to the housing 12.

The ECU 100 can control the operation of the electric motor 20 by controlling the electric power supplied to the coils 22. When the electric power is supplied to the coils 22, a rotating magnetic field is generated in the stator 21, and thereby the rotor 23 is rotated. Thus, a torque of rotation is outputted from the rotor 23. As described above, the electric motor 20 includes the stator 21 and the rotor 23, and the rotor 23 is configured to be rotated relative to the stator 21. The electric motor 20 is configured to output the torque of rotation through rotation thereof in response to supply of an electric power to the electric motor 20.

The rotor 23 is placed on the radially inner side of the stator 21 and is configured to rotate relative to the stator 21. The electric motor 20 is an inner rotor type brushless DC motor.

In the present embodiment, the clutch actuator 10 includes a plurality of rotational angle sensors 104. The rotational angle sensors 104 are installed to the electric motor 20 such that the rotational angle sensors 104 are placed on the housing plate portion 122 side of the coils 22.

Each of the rotational angle sensors 104 is configured to sense a magnetic flux generated from sensor magnets rotated integrally with the rotor 23 and output a signal, which corresponds to the sensed magnetic flux, to the ECU 100. Therefore, the ECU 100 senses the rotational angle and the rotational speed of the rotor 23 based on the signals outputted from the rotational angle sensors 104. Furthermore, based on the rotational angle and the rotational speed of the rotor 23, the ECU 100 can calculate a relative rotational angle of the drive cam 40 relative to the housing 12 and a driven cam 50 described later and a relative axial position of the driven cam 50 and the state shifter 80 relative to the housing 12 and the drive cam 40.

Figure 3:
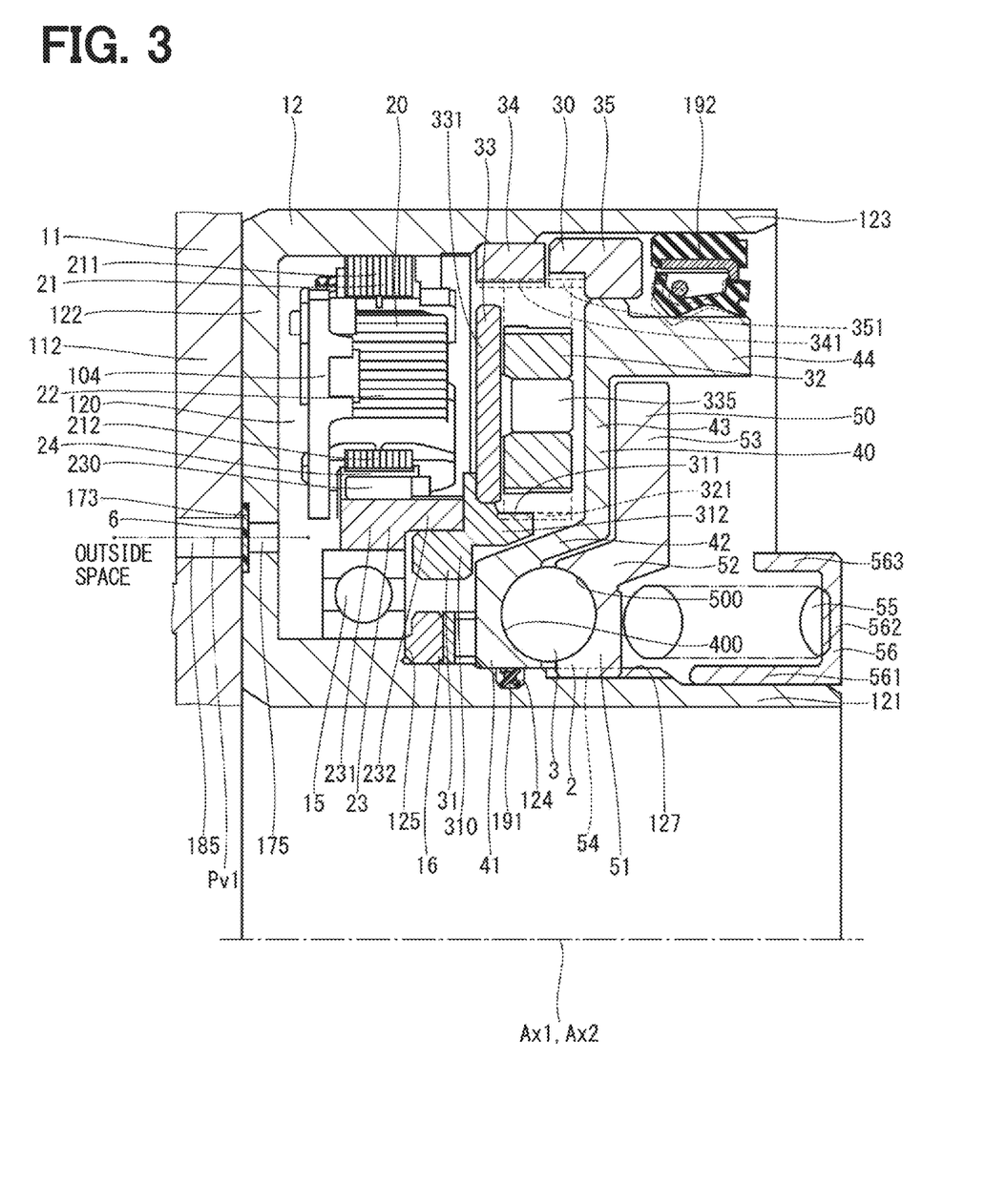
FIG. 3 is a cross-sectional view showing the portion of the clutch actuator according to the first embodiment.

As shown in FIG. 3, the speed reducer 30 includes a sun gear 31, a plurality of planetary gears 32, a carrier 33, a first ring gear 34 and a second ring gear 35.

The sun gear 31 is coaxial with the rotor 23 and is configured to rotate integrally with the rotor 23. That is, the rotor 23 and the sun gear 31 are formed separately from each other from different materials, respectively, and are placed coaxial with each other such that the rotor 23 and the sun gear 31 are integrally rotatable.

More specifically, the sun gear 31 includes a sun gear base 310, a plurality of sun gear teeth (serving as teeth and external teeth) 311 and a sun gear tubular portion 312. The sun gear base 310 is shaped generally in an annular form and is made of, for example, metal. The sun gear tubular portion 312 is formed integrally with the sun gear base 310 in one-piece such that the sun gear tubular portion 312 extends from an outer periphery of the sun gear base 310 and is shaped in a tubular form. The sun gear teeth 311 are formed at an outer peripheral wall of an end portion of the sun gear tubular portion 312 which is opposite from the sun gear base 310.

The sun gear 31 is installed such that an outer peripheral wall of the sun gear base 310 is fitted to an inner peripheral wall of the rotor tubular portion 232. In this way, the sun gear 31 is supported by the rotor bearing 15 along with the rotor 23 such that the sun gear 31 and the rotor 23 are rotatable relative to the housing 12.

The sun gear 31, which is rotated integrally with the rotor 23, receives the torque transmitted from the electric motor 20. Here, the sun gear 31 serves as an input element of the speed reducer 30.

The planetary gears 32 are arranged one after another in the circumferential direction of the sun gear 31. Each of the planetary gears 32 meshes with the sun gear 31 and is configured to rotate and revolve around the sun gear 31 in the circumferential direction of the sun gear 31. More specifically, each of the planetary gears 32 is made of, for example, metal and is shaped generally in a cylindrical tubular form, and the planetary gears 32 are located on the radially outer side of the sun gear 31 and are arranged at equal intervals in the circumferential direction of the sun gear 31. Each of the planetary gears 32 includes a plurality of planetary gear teeth (serving as teeth and external teeth) 321. The planetary gear teeth 321 are formed at an outer peripheral wall of the planetary gear 32 and are configured to mesh with the sun gear teeth 311.

The carrier 33 rotatably supports the planetary gears 32 and is configured to rotate relative to the sun gear 31.

More specifically, the carrier 33 includes a carrier main body 331 and a plurality of pins 335. The carrier main body 331 is made of, for example, metal and is shaped generally in a circular annular plate form. The carrier main body 331 is positioned between the coils 22 and the planetary gears 32 in the axial direction.

Each of the pins 335 is made of, for example, metal and is shaped generally in a cylindrical columnar form. An axial end portion of each pin 335 is fixed to the carrier main body 331.

The speed reducer 30 includes a plurality of planetary gear bearings 36. Each of the planetary gear bearings 36 is installed between an outer peripheral wall of a corresponding one of the pins 335 and an inner peripheral wall of a corresponding one of the planetary gears 32. Therefore, each of the planetary gears 32 is rotatably supported by the corresponding pin 335 through the corresponding planetary gear bearing 36. That is, each of the pins 335 is installed at the rotational center of the corresponding planetary gear 32 and rotatably supports the corresponding planetary gear 32. Furthermore, each planetary gear 32 and the corresponding pin 335 can make a relative movement therebetween in the axial direction within a predetermined range through the corresponding planetary gear bearing 36. In other words, the movable range for making the relative movement between the planetary gear 32 and the pin 335 in the axial direction is limited within the predetermined range by the planetary gear bearing 36.

The first ring gear 34 includes a plurality of first ring gear teeth 341 which can mesh with the planetary gears 32, and the first ring gear 34 is fixed to the housing 12. More specifically, the first ring gear 34 is made of, for example, metal and is shaped generally in a cylindrical tubular form. On an opposite side of the stator 21, which is opposite to the housing plate portion 122, the first ring gear 34 is fixed to the housing 12 such that an outer periphery of the first ring gear 34 is fitted to the inner peripheral wall of the housing outer tubular portion 123. Therefore, the first ring gear 34 is not rotatable relative to the housing 12.

Here, the first ring gear 34 is coaxial with the housing 12, the rotor 23 and the sun gear 31. The first ring gear teeth (serving as teeth and internal teeth) 341 are formed at an inner peripheral wall of the first ring gear 34 such that the first ring gear teeth 341 can mesh with one axial end portions of the planetary gear teeth 321 of each of the planetary gears 32.

The second ring gear 35 includes a plurality of second ring gear teeth 351 which are configured to mesh with the planetary gears 32. The number of the second ring gear teeth 351 of the second ring gear 35 (a total tooth number of the second ring gear 35) is different from the number of the first ring gear teeth 341 of the first ring gear 34 (a total tooth number of the first ring gear 34). Furthermore, the second ring gear 35 is configured to rotate integrally with the drive cam 40 described later. More specifically, the second ring gear 35 is made of, for example, metal and is shaped in a tubular form.

Here, the second ring gear 35 is coaxial with the housing 12, the rotor 23 and the sun gear 31. The second ring gear teeth (serving as teeth and internal teeth) 351 are formed at an inner peripheral wall of an axial end portion of the second ring gear 35, which is adjacent to the first ring gear 34, such that the second ring gear teeth 351 can mesh with the other axial end portions of the planetary gear teeth 321 of each of the planetary gears 32. In the present embodiment, the number of the second ring gear teeth 351 is larger than the number of the first ring gear teeth 341. More specifically, the number of the second ring gear teeth 351 is larger than the number of the first ring gear teeth 341 by the number that is obtained by multiplying the number of the planetary gears 32 by an integer.

Furthermore, each of the planetary gears 32 must normally mesh with the first ring gear 34 and the second ring gear 35, which have two different specifications, respectively, at the same location without generating interference. Therefore, each of the planetary gears 32 is designed such that a center distance (center-to-center distance) of each gear pair is kept constant by displacing one or both of the first ring gear 34 and the second ring gear 35.

With the above configuration, when the rotor 23 of the electric motor 20 is rotated, the sun gear 31 is rotated. Therefore, in the state where the planetary gear teeth 321 of each planetary gear 32 mesh with the sun gear teeth 311, the first ring gear teeth 341 and the second ring gear teeth 351, each planetary gear 32 is rotated and is revolved around the sun gear 31 in the circumferential direction of the sun gear 31. Here, since the number of the second ring gear teeth 351 is larger than the number of the first ring gear teeth 341, the second ring gear 35 is rotated relative to the first ring gear 34. Therefore, among the first ring gear 34 and the second ring gear 35, small differential rotation, which corresponds to a difference between the number of the first ring gear teeth 341 and the number of the second ring gear teeth 351, is outputted as the rotation of the second ring gear 35. Thus, the torque of the rotation, which is transmitted from the electric motor 20, is outputted from the second ring gear 35 after the rotational speed of the rotation is reduced by the speed reducer 30. As described above, the speed reducer 30 is configured to output the torque of the rotation, which is transmitted from the electric motor 20, after reducing the rotational speed of the rotation. In the present embodiment, the speed reducer 30 is a speed reducer having a 3K-type mechanical paradox planetary gear drive.

The second ring gear 35 is formed separately from the drive cam 40 described later and is configured to rotate integrally with the drive cam 40. The second ring gear 35 outputs the torque of the rotation, which is transmitted from the electric motor 20, to the drive cam 40 after reducing the rotational speed of the rotation. Here, the second ring gear 35 serves as an output element of the speed reducer 30.

The torque cam 2 includes: the drive cam (serving as a rotary element) 40; the driven cam (serving as a translating element) 50; and a plurality of cam balls (serving as rolling-elements and cam rolling-elements) 3.

The drive cam 40 includes a drive cam main body 41, a drive cam specific shape portion 42, a drive cam plate portion 43, a drive cam outer tubular portion 44 and a plurality of drive cam grooves 400. The drive cam main body 41 is shaped generally in a circular annular plate form. The drive cam specific shape portion 42 extends from an outer periphery of the drive cam main body 41 and is tilted relative to an axis Ax1 of the drive cam main body 41. The drive cam plate portion 43 is shaped generally in a circular annular plate form and radially outwardly extends from an end portion of the drive cam specific shape portion 42 which is opposite to the drive cam main body 41. The drive cam outer tubular portion 44 is shaped generally in a cylindrical tubular form and extends from an outer periphery of the drive cam plate portion 43 toward a side that is opposite to the drive cam specific shape portion 42. Here, the drive cam main body 41, the drive cam specific shape portion 42, the drive cam plate portion 43 and the drive cam outer tubular portion 44 are formed integrally in one-piece from, for example, metal.

The drive cam grooves 400 are recessed from one end surface (the drive cam specific shape portion 42 side surface) of the drive cam main body 41 toward another end surface of the drive cam main body 41 and extend in the circumferential direction of the drive cam main body 41. Each of the drive cam grooves 400 changes its depth, which is measured from the one end surface of the drive cam main body 41, in the circumferential direction of the drive cam main body 41. The number of the drive cam grooves 400 is, for example, three, and these three drive cam grooves 400 are arranged at equal intervals in the circumferential direction of the drive cam main body 41.

The drive cam 40 is installed between the housing inner tubular portion 121 and the housing outer tubular portion 123 such that the drive cam main body 41 is placed between the outer peripheral wall of the housing inner tubular portion 121 and the inner peripheral wall of the sun gear tubular portion 312 of the sun gear 31, and the drive cam plate portion 43 is placed on an opposite side of the planetary gears 32 which is opposite to the carrier main body 331. The drive cam 40 is configured to rotate relative to the housing 12.

The second ring gear 35 is formed integrally with the drive cam 40 such that an inner peripheral wall of an end portion of the second ring gear 35, which is opposite to the end portion of the second ring gear 35 that has the second ring gear teeth 351, is fitted to an outer periphery of the drive cam plate portion 43. The second ring gear 35 is not rotatable relative to the drive cam 40. That is, the second ring gear 35 is configured to rotate integrally with the drive cam (serving as the rotary element) 40. Therefore, when the second ring gear 35 outputs the torque of the rotation, which is transmitted from the electric motor 20 after reducing the rotational speed of the rotation through the speed reducer 30, the drive cam 40 is rotated relative to the housing 12. Specifically, the drive cam 40 is rotated relative to the housing 12 when the torque, which is outputted from the speed reducer 30, is inputted to the drive cam 40.

The driven cam 50 includes a driven cam main body 51, a driven cam specific shape portion 52, a driven cam plate portion 53, a plurality of cam-side spline grooves 54 and a plurality of driven cam grooves 500. The driven cam main body 51 is shaped generally in a circular annular plate form. The driven cam specific shape portion 52 extends from an outer periphery of the driven cam main body 51 and is tilted relative to an axis Ax2 of the driven cam main body 51. The driven cam plate portion 53 is shaped generally in a circular annular plate form and radially outwardly extends from an end portion of the driven cam specific shape portion 52 which is opposite to the driven cam main body 51. Here, the driven cam main body 51, the driven cam specific shape portion 52 and the driven cam plate portion 53 are formed integrally in one-piece from, for example, metal.

The cam-side spline grooves 54 are formed at an inner peripheral wall of the driven cam main body 51 and extend in the axial direction. The cam-side spline grooves 54 are arranged one after another in the circumferential direction of the driven cam main body 51.

The driven cam 50 is arranged such that the driven cam main body 51 is placed on a side of the drive cam main body 41, which is opposite to the rotor bearing 15, while the driven cam main body 51 is placed on a radially inner side of the drive cam specific shape portion 42 and the drive cam plate portion 43, and the cam-side spline grooves 54 are spline-coupled with the housing-side spline grooves 127. Therefore, the driven cam 50 is not rotatable relative to the housing 12 and is movable relative to the housing 12 in the axial direction.

The driven cam grooves 500 are recessed from one end surface (the drive cam main body 41 side surface) of the driven cam main body 51 toward another end surface of the driven cam main body 51 and extend in the circumferential direction of the driven cam main body 51. Each of the driven cam grooves 500 changes its depth, which is measured from the one end surface of the driven cam main body 51, in the circumferential direction of the driven cam main body 51. The number of the driven cam grooves 500 is, for example, three, and these three driven cam grooves 500 are arranged at equal intervals in the circumferential direction of the driven cam main body 51.

The drive cam grooves 400 and the driven cam grooves 500 respectively have an identical shape when viewed from a surface of the drive cam main body 41, which is placed on the driven cam main body 51 side, or viewed from a surface of the driven cam main body 51, which is placed on the drive cam main body 41 side.

Each of the cam balls 3 is made of, for example, metal and is shaped in a spherical form. Each of the cam balls 3 is rotatably placed between a corresponding one of the three drive cam grooves 400 and a corresponding one of the three driven cam grooves 500. That is, the number of the cam balls 3 is three.

As described above, the drive cam 40, the driven cam 50 and the cam balls 3 form the torque cam (serving as the rolling-element cam) 2. When the drive cam 40 is rotated relative to the housing 12 and the driven cam 50, each of the cam balls 3 is rolled along a groove bottom of the corresponding drive cam groove 400 and a groove bottom of the corresponding driven cam groove 500.

As described above, the depth of each of the drive cam grooves 400 and the driven cam grooves 500 changes in the circumferential direction of the drive cam 40 or the driven cam 50. Therefore, when the drive cam 40 is rotated relative to the housing 12 and the driven cam 50 by the torque, which is outputted from the speed reducer 30, each of the cam balls 3 is rolled along the corresponding drive cam groove 400 and the corresponding driven cam groove 500, and thereby the driven cam 50 is moved, i.e., is reciprocated in the axial direction relative to the drive cam 40 and the housing 12.

As described above, the driven cam 50 has the driven cam grooves 500, each of which is formed at the one end surface of the driven cam 50 and clamps the corresponding cam ball 3 in cooperation with the corresponding drive cam groove 400, and the driven cam 50 cooperates with the drive cam 40 and the cam balls 3 to form the torque cam 2. When the drive cam 40 is rotated relative to the housing 12, the driven cam 50 is moved in the axial direction relative to the drive cam 40 and the housing 12. Here, since the cam-side spline grooves 54 are spline-coupled with the housing-side spline grooves 127, the driven cam 50 is not rotated relative to the housing 12. Furthermore, although the drive cam 40 is rotated relative to the housing 12, the drive cam 40 is not moved in the axial direction relative to the housing 12.

The torque cam 2 is placed on the one side of the electric motor 20 in the axial direction and converts the rotating motion, which is generated by the torque transmitted from the electric motor 20, into the translating motion that is the movement in the axial direction relative to the housing 12.

In the present embodiment, the clutch actuator 10 includes a return spring (serving as an urging member) 55 and a return spring retainer 56. The return spring 55 is, for example, a coil spring. On a side of the driven cam main body 51, which is opposite to the drive cam main body 41, the return spring 55 is placed on the radially outer side of the housing inner tubular portion 121. One end portion of the return spring 55 contacts a surface of the driven cam main body 51 which is opposite to the drive cam main body 41.

The return spring retainer 56 includes a retainer inner tubular portion 561, a retainer plate portion 562 and a retainer outer tubular portion 563. The retainer inner tubular portion 561 is shaped generally in a cylindrical tubular form. The retainer plate portion 562 is shaped in an annular plate form such that the retainer plate portion 562 radially outwardly extends from one end portion of the retainer inner tubular portion 561. The retainer outer tubular portion 563 is shaped generally in a cylindrical tubular form such that the retainer outer tubular portion 563 extends from an outer periphery of the retainer plate portion 562 toward the same axial side as the retainer inner tubular portion 561. The retainer inner tubular portion 561, the retainer plate portion 562 and the retainer outer tubular portion 563 are formed integrally in one-piece from, for example, metal.

The return spring retainer 56 is fixed to the housing inner tubular portion 121 such that an inner peripheral wall of the retainer inner tubular portion 561 is fitted to an outer peripheral wall of the housing inner tubular portion 121. The other end portion of the return spring 55 contacts the retainer plate portion 562 at a location between the retainer inner tubular portion 561 and the retainer outer tubular portion 563.

The return spring 55 has an axially expanding force. Therefore, the driven cam 50 is urged by the return spring 55 toward the drive cam main body 41 in the state where the cam balls 3 are clamped between the driven cam 50 and the drive cam 40.

The output shaft 62 includes a shaft portion 621, a plate portion 622, a tubular portion 623 and a friction plate 624 (see FIG. 2). The shaft portion 621 is shaped generally in a cylindrical tubular form. The plate portion 622 is formed integrally with the shaft portion 621 in one-piece such that the plate portion 622 is shaped in an annular plate form and radially outwardly extends from one end of the shaft portion 621. The tubular portion 623 is formed integrally with the plate portion 622 in one-piece such that the tubular portion 623 is shaped generally in a cylindrical tubular form and extends from an outer periphery of the plate portion 622 toward a side that is opposite to the shaft portion 621. The friction plate 624 is shaped generally in a circular annular plate form and is installed at an end surface of the plate portion 622 which faces the tubular portion 623. Here, the friction plate 624 is not rotatable relative to the plate portion 622. A clutch space 620 is formed at an inside of the tubular portion 623.

An end portion of the input shaft 61 extends through an inside of the housing inner tubular portion 121 and is placed on a side of the driven cam 50 which is opposite to the drive cam 40. The output shaft 62 is coaxial with the input shaft 61 and is placed on a side of the driven cam 50 which is opposite to the drive cam 40. A ball bearing 142 is installed between an inner peripheral wall of the shaft portion 621 and an outer peripheral wall of the end portion of the input shaft 61. Therefore, the output shaft 62 is rotatably supported by the input shaft 61 through the ball bearing 142. The input shaft 61 and the output shaft 62 are rotatable relative to the housing 12.

The clutch 70 is placed in the clutch space 620 at a location between the input shaft 61 and the output shaft 62. The clutch 70 includes a plurality of inner friction plates 71, a plurality of outer friction plates 72 and an anchoring portion 701. The inner friction plates 71 are respectively shaped generally in a circular annular plate form and are arranged one after another in the axial direction at a location between the input shaft 61 and the tubular portion 623 of the output shaft 62. An inner periphery of each of the inner friction plates 71 is spline-coupled to the outer peripheral wall of the input shaft 61. Therefore, each inner friction plate 71 is not rotatable relative to the input shaft 61 and is movable relative to the input shaft 61 in the axial direction.

The outer friction plates 72 are respectively shaped generally in a circular annular plate form and are arranged one after another in the axial direction at the location between the input shaft 61 and the tubular portion 623 of the output shaft 62. The inner friction plates 71 and the outer friction plates 72 are alternately arranged in the axial direction of the input shaft 61. An outer periphery of each of the outer friction plates 72 is spline-coupled to the inner peripheral wall of the tubular portion 623 of the output shaft 62. Therefore, each outer friction plate 72 is not rotatable relative to the output shaft 62 and is movable relative to the output shaft 62 in the axial direction. The closest one of the outer friction plates 72, which is the closest to the friction plate 624, can contact the friction plate 624.

The anchoring portion 701 is shaped generally in a circular annular form and is installed such that an outer periphery of the anchoring portion 701 is fitted into the inner peripheral wall of the tubular portion 623 of the output shaft 62. The outer periphery of the closest one of the outer friction plates 72, which is the closest to the driven cam 50, can be anchored to the anchoring portion 701. Therefore, removal of the outer friction plates 72 and the inner friction plates 71 from the inside of the tubular portion 623 is limited. A distance between the anchoring portion 701 and the friction plate 624 is larger than a sum of plate thicknesses of the outer friction plates 72 and the inner friction plates 71.

In a coupled state where the inner friction plates 71 and the outer friction plates 72 are in contact with each other, i.e., are coupled with each other, a frictional force is generated between the inner friction plates 71 and the outer friction plates 72. Relative rotation between the inner friction plates 71 and the outer friction plates 72 is limited according to the amount of this frictional force. In contrast, in a decoupled state where the inner friction plates 71 and the outer friction plates 72 are spaced from each other, i.e., are decoupled from each other, the frictional force is not generated between the inner friction plates 71 and the outer friction plates 72. Therefore, the relative rotation between the inner friction plates 71 and the outer friction plates 72 is not limited.

In the coupled state of the clutch 70, the torque, which is inputted to the input shaft 61, is transmitted to the output shaft 62 through the clutch 70. In contrast, in the decoupled state of the clutch 70, the torque, which is inputted to the input shaft 61, is not transmitted to the output shaft 62.

As described above, the clutch 70 is configured to transmit the torque between the input shaft 61 and the output shaft 62. In the coupled state, the clutch 70 enables the transmission of the torque between the input shaft 61 and the output shaft 62. In contrast, in the decoupled state, the clutch 70 blocks the transmission of the torque between the input shaft 61 and the output shaft 62.

In the present embodiment, the clutch device 1 is a normally open type clutch device that is normally in the decoupled state.

The state shifter 80 includes a coned disc spring (serving as a resiliently deformable portion) 81, a disc spring retainer 82 and a disc spring thrust bearing 83. The disc spring retainer 82 includes a retainer tubular portion 821 and a retainer flange 822. The retainer tubular portion 821 is shaped generally in a cylindrical tubular form. The retainer flange 822 is shaped in an annular plate form such that the retainer flange 822 radially outwardly extends from an end portion of the retainer tubular portion 821. The retainer tubular portion 821 and the retainer flange 822 are formed integrally in one-piece from, for example, metal. The disc spring retainer 82 is installed to the driven cam 50 such that, for example, the other end of the retainer tubular portion 821 contacts the end surface of the driven cam plate portion 53, which is opposite to the drive cam 40. Here, the retainer tubular portion 821 and the driven cam plate portion 53 are joined together by, for example, welding.

An inner periphery of the coned disc spring 81 is placed on the radially outer side of the retainer tubular portion 821 at a location between the driven cam plate portion 53 and the retainer flange 822. The disc spring thrust bearing 83 is shaped in an annular form and is placed on the radially outer side of the retainer tubular portion 821 at a location between the driven cam plate portion 53 and the inner periphery of the coned disc spring 81.

The disc spring retainer 82 is fixed to the driven cam 50 such that the retainer flange 822 can engage with one axial end portion of the coned disc spring 81, i.e., the inner periphery of the coned disc spring 81. Therefore, removal of the coned disc spring 81 and the disc spring thrust bearing 83 from the disc spring retainer 82 is limited by the retainer flange 822. The coned disc spring 81 is resiliently deformable in the axial direction.

FIG. 3 is a cross-sectional view showing the clutch actuator 10 in a state where the state shifter 80 is not installed.

As shown in FIGS. 1 and 2, in a state where each cam ball 3 is placed at: a position (initial point), which serves as a deepest part of the corresponding drive cam groove 400 and is farthest away from the one end surface of the drive cam main body 41 in the axial direction of the drive cam main body 41 (i.e., the depth direction of the corresponding drive cam groove 400); and a position (initial point), which serves as a deepest part of the corresponding driven cam groove 500 and is farthest away from the one end surface of the driven cam main body 51 in the axial direction of the driven cam main body 51 (i.e., the depth direction of the corresponding driven cam groove 500), a distance between the drive cam 40 and the driven cam 50 is relatively short, and a gap Sp1 is formed between the other axial end portion of the coned disc spring 81, i.e., the outer periphery of the coned disc spring 81 and the clutch 70 (see FIG. 1). Therefore, the clutch 70 is in the decoupled state, and thereby the transmission of the torque between the input shaft 61 and the output shaft 62 is blocked.

At the normal operation time, during which the state of the clutch 70 is changed, when the electric power is supplied to the coils 22 of the electric motor 20 through the control of the ECU 100, the electric motor 20 is rotated, and the torque is outputted from the speed reducer 30. Therefore, the drive cam 40 is rotated relative to the housing 12. Thus, each cam ball 3 is rolled from the position, which serves as the deepest part, toward the one side in the circumferential direction of the drive cam groove 400 and the driven cam groove 500. In this way, the driven cam 50 is moved in the axial direction relative to the housing 12, i.e., is moved toward the clutch 70 while compressing the return spring 55. Thereby, the coned disc spring 81 is moved toward the clutch 70.

When the coned disc spring 81 is moved toward the clutch 70 in response to the movement of the driven cam 50 in the axial direction, the gap Sp1 is reduced, and the other axial end portion of the coned disc spring 81 contacts the outer friction plate 72 of the clutch 70. When the driven cam 50 is moved further in the axial direction after the contact of the coned disc spring 81 to the clutch 70, the coned disc spring 81 is resiliently deformed in the axial direction and urges the outer friction plate 72 toward the friction plate 624. Therefore, the inner friction plates 71 and the outer friction plates 72 are coupled to each other, and thereby the clutch 70 is placed in the coupled state. As a result, the transmission of the torque between the input shaft 61 and the output shaft 62 is enabled.

At this time, the coned disc spring 81 is rotatably supported by the disc spring thrust bearing 83 and is rotated relative to the driven cam 50 and the disc spring retainer 82. As described above, the disc spring thrust bearing 83 receives the load from the coned disc spring 81 in the thrust direction and rotatably supports the coned disc spring 81.

When the clutch transmission torque reaches a required clutch torque capacity, the ECU 100 stops the rotation of the electric motor 20. Therefore, the clutch 70 is held in a coupling holding state (state of holding the coupling), in which the clutch transmission torque is maintained at the required clutch torque capacity. As described above, the coned disc spring 81 of the state shifter 80 can receive the force from the driven cam 50 in the axial direction and shift the state of the clutch 70 to the coupled state or the decoupled state according to the relative axial position of the driven cam 50 relative to the housing 12 and the drive cam 40.

Furthermore, the torque cam 2 can convert the rotating motion, which is generated by the torque transmitted from the electric motor 20, into the translating motion, which is the relative movement relative to the housing 12 in the axial direction, to shift the state of the clutch 70 to the coupled state or the decoupled state.

At the output shaft 62, an end portion of the shaft portion 621, which is opposite to the plate portion 622, is coupled to the input shaft of the transmission (not shown) so that the output shaft 62 can rotate integrally with the input shaft of the transmission. That is, the torque, which is outputted from the output shaft 62, is inputted to the input shaft of the transmission. The torque of the rotation, which is inputted to the transmission, is outputted to the drive wheels of the vehicle as a drive torque after the rotational speed of the rotation is changed at the transmission. Thereby, the vehicle is driven.

In the present embodiment, the clutch device 1 includes an oil supply portion 5 (see FIGS. 1 and 2). The oil supply portion 5 is formed in a form of a passage at the output shaft 62 such that one end of the oil supply portion 5 is exposed to the clutch space 620. The other end of the oil supply portion 5 is connected to an oil supply source (not shown). Therefore, oil is supplied from the one end of the oil supply portion 5 to the clutch 70 at the clutch space 620. This oil is, for example, lubricant oil, such as transmission oil.

The ECU 100 control the amount of the oil supplied from the oil supply portion 5 to the clutch 70. The oil, which is supplied to the clutch 70, can lubricate and cool the clutch 70. Thus, in the present embodiment, the clutch 70 is a wet clutch and can be cooled by the oil.

In the present embodiment, the torque cam (serving as the rotation-to-translation converter) 2 forms the receiving space 120 between: the drive cam (serving as the rotary element) 40 and the second ring gear 35; and the housing 12. Here, the receiving space 120 is formed at the inside of the housing 12 at the location that is on the opposite side of the drive cam 40 and the second ring gear 35 which is opposite to the clutch 70. The electric motor 20 and the speed reducer 30 are installed in the receiving space 120. The clutch 70 is installed in the clutch space 620 that is a space located on the opposite side of the drive cam 40 which is opposite to the receiving space 120.

The thrust bearing 16 is installed between the drive cam main body 41 and the housing step surface 125. The thrust bearing 16 rotatably supports the drive cam 40 while receiving a load, which is applied from the drive cam 40 in the thrust direction, i.e., the axial direction. In the present embodiment, the load, which is applied from the clutch 70 side in the axial direction, is applied to the thrust bearing 16 through the coned disc spring 81, the disc spring thrust bearing 83, the driven cam 50, the cam balls 3 and the drive cam 40.

In the present embodiment, the clutch actuator 10 includes an inner seal member (serving as a cam seal member) 191 and an outer seal member (serving as a cam seal member) 192. The inner seal member 191 is an oil seal which is shaped in an annular form. The inner seal member 191 is made of an elastic material (e.g., rubber). The outer seal member 192 is an oil seal which is shaped in an annular form. The outer seal member 192 is made of an elastic material (e.g., rubber) and a metal ring.

The inner seal member 191 is installed in the seal groove 124 formed at the housing inner tubular portion 121. The inner seal member 191 is installed in the seal groove 124 such that an outer periphery of the inner seal member 191 is slidable relative to an inner peripheral wall of the drive cam main body 41.

The outer seal member 192 is placed between the housing outer tubular portion 123 and the drive cam outer tubular portion 44 at a location that is on an opposite side of the second ring gear 35 which is opposite to the first ring gear 34. The outer seal member 192 is installed to the housing outer tubular portion 123 such that a seal lip of an inner periphery of the outer seal member 192 is slidable relative to an outer peripheral wall of the drive cam outer tubular portion 44.

Here, when the outer seal member 192 is viewed in the axial direction of the inner seal member 191, the outer seal member 192 is placed on the radially outer side of the inner seal member 191 (see FIGS. 1 and 2).

As described above, the inner peripheral wall of the drive cam main body 41 is slidable relative to the inner seal member 191. That is, the inner seal member 191 is configured to contact the drive cam (serving as the rotary element) 40. The inner seal member 191 provides the gas-tight or liquid-tight seal between the drive cam main body 41 and the housing inner tubular portion 121.

The outer peripheral wall of the drive cam outer tubular portion 44 is slidable relative to the seal lip that is the inner periphery of the outer seal member 192. Specifically, the outer seal member 192 is configured to contact the drive cam (serving as the rotary element) 40. The outer seal member 192 provides the gas-tight or liquid-tight seal between the outer peripheral wall of the drive cam outer tubular portion 44 and the inner peripheral wall of the housing outer tubular portion 123.

The inner seal member 191 and the outer seal member 192 can maintain the gas-tight or liquid-tight sealing of the receiving space 120, which receives the electric motor 20 and the speed reducer 30. Also, the inner seal member 191 and the outer seal member 192 can maintain the gas-tight or liquid-tight sealing between: the receiving space 120; and the clutch space 620 which receives the clutch 70. Therefore, even when the foreign objects, such as wear particles, are generated at, for example, the clutch 70, it is possible to limit the intrusion of the foreign objects from the clutch space 620 into the receiving space 120. Therefore, it is possible to limit malfunctions of the electric motor 20 or the speed reducer 30 caused by the foreign objects.

Hereinafter, the structure of the respective portions of the present embodiment will be described in detail.

As shown in FIG. 2, the transmission case 11 includes a case inner tubular portion 111, a case plate portion 112 and a case outer tubular portion 113. The case inner tubular portion 111 is shaped in a tubular form. The case plate portion 112 is shaped in an annular plate form such that the case plate portion 112 radially outwardly extends from an end portion of the case inner tubular portion 111. The case outer tubular portion 113 is shaped in a tubular form such that the case outer tubular portion 113 extends from an outer periphery of the case plate portion 112 toward the same axial side as the case inner tubular portion 111. The case inner tubular portion 111, the case plate portion 112 and the case outer tubular portion 113 form a part of the transmission case 11.

The housing 12 of the clutch actuator 10 is placed in a portion of the inside space of the transmission case 11, which is located between the case inner tubular portion 111 and the case outer tubular portion 113, such that the housing plate portion 122 contacts the case plate portion 112. Here, an inner peripheral wall of the housing inner tubular portion 121 is configured to contact an outer peripheral wall of the case inner tubular portion 111. An outer peripheral wall of the housing outer tubular portion 123 is configured to contact an inner peripheral wall of the case outer tubular portion 113.

The housing plate portion 122 is configured to contact the case plate portion 112 that is a part of the transmission case 11. The receiving space 120, which receives the electric motor 20, is located on one side of the housing plate portion 122 which is opposite to the case plate portion 112.

The housing 12 includes: a housing ventilation hole 175 that extends through the housing plate portion 122 in a plate thickness direction thereof (a direction of a thickness of the housing plate portion 122) and communicates between an outside space of the housing 12 and the receiving space 120; and a breathable filter 6 that is placed on a side of the housing ventilation hole 175, at which the case plate portion 112 is placed, to cover the housing ventilation hole 175, while the breathable filter 6 is configured to permit a gas to pass through the breathable filter 6.

More specifically, the breathable filter 6 is formed in a form of a circular sheet, for example, from a fluoropolymer having numerous micropores. The breathable filter 6 permits the gas to pass through the breathable filter 6 but blocks the liquid from passing through the breathable filter 6.

The housing 12 includes a housing recess 173 that is recessed from a surface of the housing plate portion 122, which is located on the other side of the housing plate portion 122 where the case plate portion 112 is placed, toward the one side of the housing plate portion 122 which is opposite to the case plate portion 112, while the housing recess 173 is configured to receive at least a portion of the breathable filter 6.

More specifically, the housing recess 173 is recessed in a form of, for example, a circular recess from the surface of the housing plate portion 122, which is located on the other side of the housing plate portion 122 where the case plate portion 112 is placed. Here, the housing ventilation hole 175 connects between a bottom surface of the housing recess 173 and a surface of the housing plate portion 122 which is located on the receiving space 120 side. An outer periphery of one end surface of the breathable filter 6 is bonded to the bottom surface of the housing recess 173, and thereby the breathable filter 6 is entirely received in the housing recess 173.

The housing ventilation hole 175 is placed along a ventilation path Pv1 that communicates between the inside space of the housing 12 and the outside space of the transmission case 11 (see FIGS. 2 and 3).

More specifically, the transmission case 11 includes a case ventilation hole 185. The case ventilation hole 185 extends through the case plate portion 112 in a plate thickness direction thereof (a direction of a thickness of the case plate portion 112) and communicates between the outside space of the transmission case 11 and the inside space of the transmission case 11. Here, the case ventilation hole 185 is formed at a location that corresponds to the housing ventilation hole 175. More specifically, the case ventilation hole 185 is formed coaxially with the housing ventilation hole 175.

The transmission case 11, which serves as the case, receives the transmission of the vehicle. In a state where the clutch actuator 10 is placed in the inside space of the transmission case 11, the outside space of the housing 12, which is located in the inside space of the transmission case 11, is a transmission oil atmosphere.

More specifically, the transmission oil is supplied from the oil supply portion 5 into the inside space of the transmission case 11. Therefore, the inside space of the transmission case 11, in which the clutch actuator 10 and the clutch 70 are placed, becomes the transmission oil atmosphere, in which the transmission oil as the liquid and transmission oil particles are present.

The torque cam 2 includes: the drive cam 40 that is shaped in an annular form and is configured to be rotated relative to the housing 12 when the torque outputted from the electric motor 20 is inputted to the drive cam 40; the driven cam 50 that is configured to be moved relative to the housing 12 in the axial direction when the drive cam 40 is rotated relative to the housing 12; and the cam balls 3 that are configured to be rolled between the drive cam 40 and the driven cam 50.

The clutch actuator 10 includes the inner seal member (serving as the cam seal member) 191 and the outer seal member (serving as the cam seal member) 192. The inner seal member 191 is placed between the inner periphery of the drive cam 40 and the housing 12 and is configured to maintain the gas-tight or liquid-tight seal between the drive cam 40 and the housing 12. The outer seal member 192 is placed between the outer periphery of the drive cam 40 and the housing 12 and is configured to maintain the gas-tight or liquid-tight seal between the drive cam 40 and the housing 12.

The inner seal member 191 and the outer seal member 192, which serve as the cam seal members, are configured to maintain the gas-tight or liquid-tight seal between: the receiving space 120; and the outside space of the housing 12 which is located in the inside space of the transmission case 11.

As described above, in the present embodiment, the housing 12 includes: the housing ventilation hole 175 that extends through the housing plate portion 122 and communicates between the outside space of the housing 12 and the receiving space 120; and the breathable filter 6 that is placed on the side of the housing ventilation hole 175, at which the case plate portion 112 is placed, to cover the housing ventilation hole 175, while the breathable filter 6 is configured to permit the gas to pass through the breathable filter 6.

In the present embodiment, the housing ventilation hole 175 can limit the change in the pressure of the receiving space 120 caused by the temperature change. Therefore, a damage to the components can be limited.

Furthermore, even in the case where the clutch actuator 10 is placed in the environment, such as the inside space of the transmission case 11, where the clutch actuator 10 may possibly be exposed to the liquid, such as the transmission oil, the breathable filter 6 can limit the liquid from entering the receiving space 120 through the housing ventilation hole 175. Therefore, it is possible to limit the intrusion of the liquid, such as the transmission oil, into the receiving space 120 of the housing 12 through the housing ventilation hole 175 to possibly result in the deterioration of the electric motor 20 or the degradation of the performance of the electric motor 20.

Furthermore, when the breathable filter 6 is placed on the side of the housing ventilation hole 175, at which the case plate portion 112 is placed, i.e., when the breathable filter 6 is clamped between the housing plate portion 122 and the case plate portion 112, the detachment of the breathable filter 6 can be limited without the need for providing the additional component such as the cover. This can limit an increase in the number of components, an increase in the number of working steps, and an increase in complexity of the structure.

Furthermore, in the present embodiment, the housing 12 includes the housing recess 173 that is recessed from the surface of the housing plate portion 122, which is located on the other side of the housing plate portion 122 where the case plate portion 112 is placed, toward the one side of the housing plate portion 122 which is opposite to the case plate portion 112, while the housing recess 173 is configured to receive at least the portion of the breathable filter 6.

Therefore, the housing plate portion 122 and the case plate portion 112 can be reliably brought in contact with each other. Furthermore, it is possible to limit the intrusion of the liquid, such as the transmission oil, into the housing ventilation hole 175 through the gap between the housing plate portion 122 and the case plate portion 112.

The housing ventilation hole 175 is placed along the ventilation path Pv1 that communicates between the inside space of the housing 12 and the outside space of the transmission case 11 (see FIG. 2).

By placing the housing ventilation hole 175 along the ventilation path Pv1, which communicates between the inside space of the housing 12, i.e., the receiving space 120 and the outside space of the transmission case 11, the change in the pressure of the receiving space 120 of the housing 12 caused by the temperature change of the receiving space 120 can be reliably limited.

The transmission case 11, which serves as the case, receives the transmission of the vehicle. In the state where the clutch actuator 10 is placed in the inside space of the transmission case 11, the outside space of the housing 12, which is located in the inside space of the transmission case 11, is the transmission oil atmosphere.

In the present embodiment, even when the outside space of the housing 12, which is located in the inside space of the transmission case 11, is the transmission oil atmosphere, the breathable filter 6 can limit the intrusion of the transmission oil into the receiving space 120 through the housing ventilation hole 175.

The torque cam 2 includes: the drive cam 40 that is shaped in the annular form and is configured to be rotated relative to the housing 12 when the torque outputted from the electric motor 20 is inputted to the drive cam 40; the driven cam 50 that is configured to be moved relative to the housing 12 in the axial direction when the drive cam 40 is rotated relative to the housing 12; and the cam balls 3 that are configured to be rolled between the drive cam 40 and the driven cam 50.

The clutch actuator 10 includes the inner seal member (serving as the cam seal member) 191 and the outer seal member (serving as the cam seal member) 192. The inner seal member 191 is placed between the inner periphery of the drive cam 40 and the housing 12 and is configured to maintain the gas-tight or liquid-tight seal between the drive cam 40 and the housing 12. The outer seal member 192 is placed between the outer periphery of the drive cam 40 and the housing 12 and is configured to maintain the gas-tight or liquid-tight seal between the drive cam 40 and the housing 12.

The inner seal member 191 and the outer seal member 192, which serve as the cam seal members, are configured to maintain the gas-tight or liquid-tight seal between: the receiving space 120; and the outside space of the housing 12 which is located in the inside space of the transmission case 11.

Therefore, even when the outside space of the housing 12, which is located in the inside space of the transmission case 11, is the transmission oil atmosphere, the inner seal member 191 and the outer seal member 192 can limit the intrusion of the transmission oil into the receiving space 120.

Furthermore, the inner seal member 191 and the outer seal member 192 maintain the gas-tightness or liquid-tightness at each of: the inside space of the housing 12; and the outside space of the housing 12 which is located in the inside space of the transmission case 11.

Second Embodiment

Figure 4:
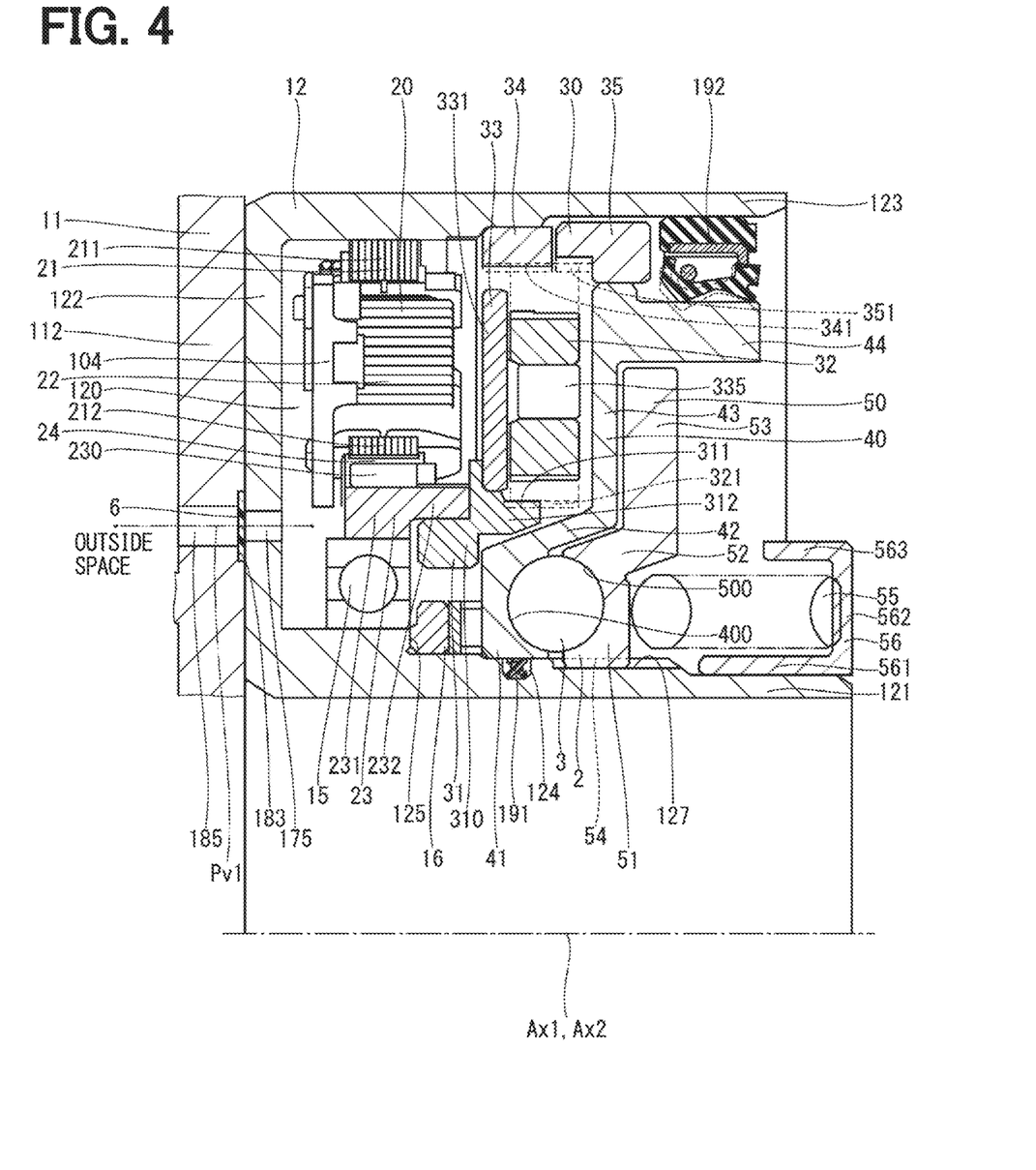
FIG. 4 is a cross-sectional view showing a portion of a clutch actuator according to a second embodiment.

FIG. 4 shows a portion of a clutch actuator according to a second embodiment. The second embodiment differs from the first embodiment with respect to the structures of the housing 12 and the transmission case 11.

In the present embodiment, the housing 12 does not have the housing recess 173.

The transmission case 11 includes a case recess 183 that is recessed from a surface of the case plate portion 112, which is located on one side of the case plate portion 112 where the housing plate portion 122 is placed, toward another side of the case plate portion 112 which is opposite to the housing plate portion 122, while the case recess 183 is configured to receive at least a portion of the breathable filter 6.

More specifically, the case recess 183 is recessed in a form of, for example, a circular recess from the surface of the case plate portion 112, which is located on the one side of the case plate portion 112 where the housing plate portion 122 is placed. An outer periphery of the other end surface of the breathable filter 6 is bonded to the bottom surface of the case recess 183, and thereby the breathable filter 6 is entirely received in the case recess 183.

As described above, in the present embodiment, the transmission case 11 includes the case recess 183 that is recessed from the surface of the case plate portion 112, which is located on the one side of the case plate portion 112 where the housing plate portion 122 is placed, toward the other side of the case plate portion 112 which is opposite to the housing plate portion 122, while the case recess 183 is configured to receive at least the portion of the breathable filter 6.

Therefore, the housing plate portion 122 and the case plate portion 112 can be reliably brought in contact with each other. Furthermore, it is possible to limit the intrusion of the liquid, such as the transmission oil, into the housing ventilation hole 175 through the gap between the housing plate portion 122 and the case plate portion 112.

Third Embodiment

Figure 5:
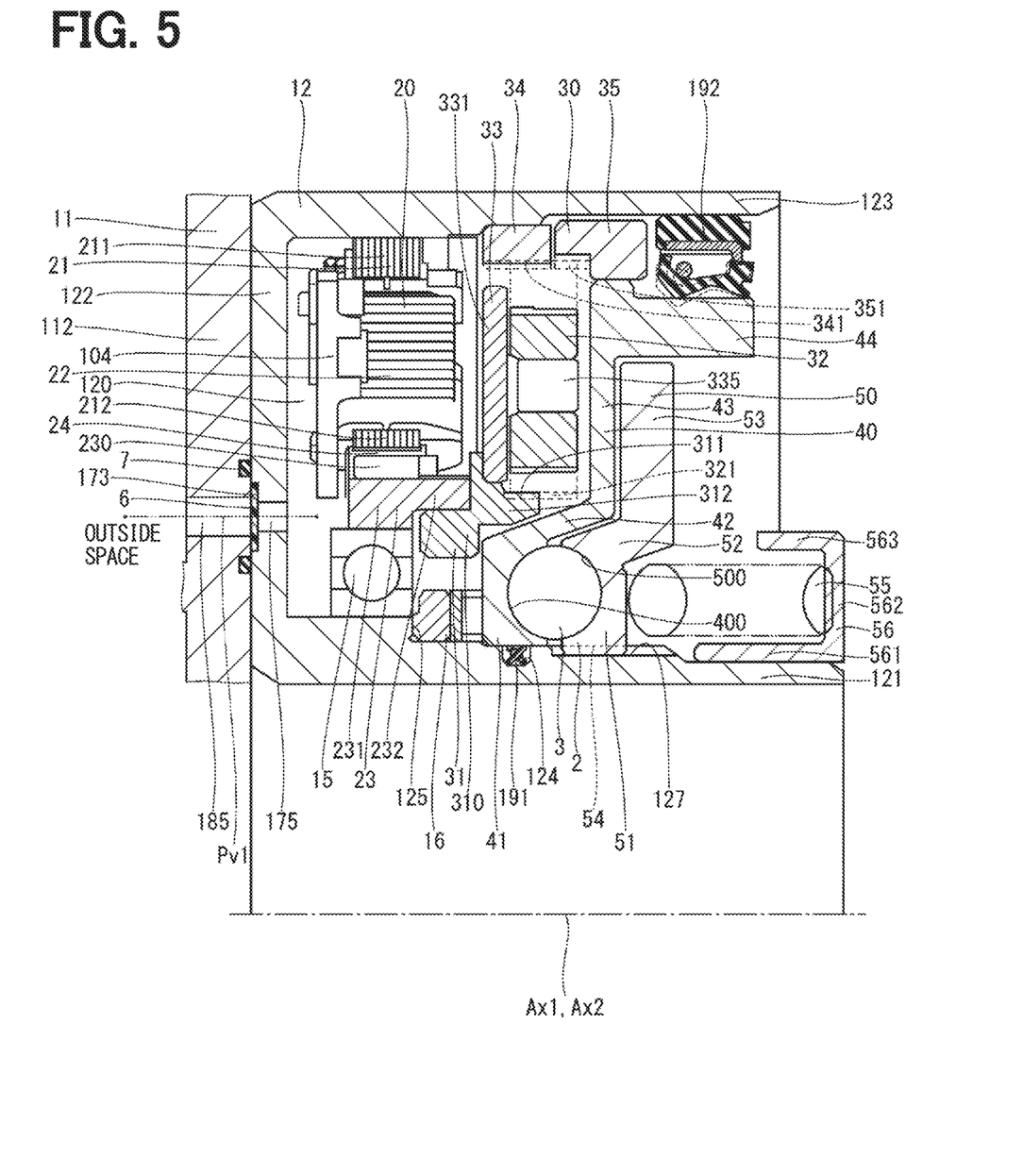
FIG. 5 is a cross-sectional view showing a portion of a clutch actuator according to a third embodiment.

FIG. 5 shows a portion of a clutch actuator according to a third embodiment. The third embodiment differs from the first embodiment with respect to the structure of the transmission case 11.

In the present embodiment, the clutch actuator 10 includes an O-ring 7 which serves as a seal member. The O-ring 7 is placed between the housing plate portion 122 and the case plate portion 112 at a location which is on a radially outer side of the housing ventilation hole 175 in a view taken in the plate thickness direction of the housing plate portion 122, while the O-ring 7 is configured to maintain a gas-tight or liquid-tight seal between the housing plate portion 122 and the case plate portion 112.

More specifically, the O-ring 7 is shaped in an annular form and is made of an elastic member, such as rubber. The O-ring 7 is placed in an annular groove that is formed on the radially outer side of the case ventilation hole 185 at the surface of the case plate portion 112 which is placed on the housing plate portion 122 side. The O-ring 7 is compressed in the axial direction when the housing plate portion 122 and the case plate portion 112 contact with each other. In this way, the gas-tight or liquid-tight seal between the housing plate portion 122 and the case plate portion 112 is maintained at the location that is on the radially outer side of the housing ventilation hole 175.

As described above, in the present embodiment, the clutch actuator 10 includes the O-ring 7 which serves as the seal member. The O-ring 7 is placed between the housing plate portion 122 and the case plate portion 112 at the location which is on the radially outer side of the housing ventilation hole 175 in the view taken in the plate thickness direction of the housing plate portion 122, while the O-ring 7 is configured to maintain the gas-tight or liquid-tight seal between the housing plate portion 122 and the case plate portion 112.

Therefore, it is possible to limit the intrusion of the liquid, such as the transmission oil, into the housing ventilation hole 175 through the gap between the housing plate portion 122 and the case plate portion 112.

Furthermore, the inner seal member 191, the outer seal member 192 and the O-ring 7 maintain the gas-tightness or liquid-tightness at each of: the inside space of the housing 12; and the outside space of the housing 12 which is located in the inside space of the transmission case 11.

Other Embodiments

In another embodiment, for example, the first embodiment and second embodiment may be combined such that the housing recess is formed at the housing plate portion, and the case recess is formed at the case plate portion.

Furthermore, in the third embodiment described above, there is indicated the example where the seal member is placed in the annular groove of the case plate portion. In contrast, in another embodiment, an annular groove may be formed at the housing plate portion, and the seal member may be placed in this annular groove.

Furthermore, in another embodiment, the cam seal members may be eliminated.

Furthermore, in another embodiment, the speed reducer may be: a speed reducer, which uses planetary gears other than the paradox planetary gears; or another type of speed reducer. Furthermore, there may be implemented a structure in which the torque of the electric motor is directly inputted to the rotation-to-translation converter without having the speed reducer.

Furthermore, in the embodiments described above, there is indicated the example where the rotation-to-translation converter is the rolling-element cam which includes the drive cam, the driven cam and the rolling elements. In contrast, in another embodiment, the rotation-to-translation converter may be formed by, for example, a slide screw or a ball screw, as long as the rotation-to-translation converter includes: a rotary element which is configured to be rotated relative to the housing; and a translating element which is configured to be moved in the axial direction relative to the housing when the rotary element is rotated relative to the housing.

The application of the present disclosure is not limited to the vehicle that is driven by the drive torque transmitted from the internal combustion engine. For example, the present disclosure may be applied to an electric vehicle and a hybrid vehicle that can be driven by a drive torque transmitted from an electric motor.

Furthermore, in the embodiments described above, there is indicated the example where the clutch actuator is placed at the inside space of the transmission case. In contrast, in another embodiment, the clutch actuator may be placed at an inside space of a case which is other than the transmission case installed on the vehicle.

Furthermore, in another embodiment, the torque may be inputted from the second transmission element and may be outputted from the first transmission element through the clutch. Furthermore, in a case where one of the first transmission element and the second transmission element is non-rotatably fixed, by placing the clutch in the coupled state, the rotation of the other one of the first transmission element and the second transmission element can be stopped. In this case, the clutch device can be used as a brake device.

As described above, the present disclosure is not limited to the embodiments described above and can be implemented in various forms without departing from the spirit of the present disclosure.

The present disclosure has been described with reference to the embodiments. However, the present disclosure is not limited to the embodiments and the structures described therein. The present disclosure also includes various variations and variations within the equivalent range. Also, various combinations and forms, as well as other combinations and forms that include only one element, more, or less, are within the scope and ideology of the present disclosure.

What is claimed is:

1. A clutch actuator for a clutch device that includes a clutch installed between a first transmission element and a second transmission element, which are configured to make relative rotation between the first transmission element and the second transmission element, while the clutch is configured to shift a state between:
    a coupled state where transmission of a torque between the first transmission element and the second transmission element is enabled; and
    a decoupled state where the transmission of the torque between the first transmission element and the second transmission element is blocked, the clutch actuator comprising:
    a housing that is placed at an inside space of a case which is configured to be installed on a vehicle, wherein the housing includes:
        a housing plate portion that is configured to contact a case plate portion of the case; and
        a receiving space that is located on one side of the housing plate portion which is opposite to the case plate portion;
    an electric motor that is placed at the receiving space and is configured to output a torque of rotation in response to supply of an electric power to the electric motor; and
    a rotation-to-translation converter that is configured to convert a rotating motion, which is generated by the torque transmitted from the electric motor, into a translating motion to shift the state of the clutch to the coupled state or the decoupled state, wherein:
    the housing includes:
        a housing ventilation hole that extends through the housing plate portion and communicates between an outside space of the housing and the receiving space; and
        a breathable filter that is placed on a side of the housing ventilation hole, at which the case plate portion is placed, to cover the housing ventilation hole, wherein the breathable filter is configured to permit a gas to pass through the breathable filter; and
    the breathable filter is placed between the housing plate portion and the case plate portion on the side of the housing ventilation hole at which the case plate portion is placed.

2. The clutch actuator according to claim 1, wherein the case plate portion has a case ventilation hole that is formed at a location that corresponds to the housing ventilation hole, and the case ventilation hole is configured to communicate between an outside space of the case and the receiving space.

3. The clutch actuator according to claim 2, wherein:
the housing includes:
- a housing inner tubular portion that is shaped in a tubular form and extends from an inner periphery of the housing plate portion; and
- a housing outer tubular portion that is shaped in a tubular form and extends from an outer periphery of the housing plate portion; and the case includes:
- a case inner tubular portion that is shaped in a tubular form and extends from an inner periphery of the case plate portion while an outer peripheral wall of the case inner tubular portion is configured to contact an inner peripheral wall of the housing inner tubular portion; and
- a case outer tubular portion that is shaped in a tubular form and extends from an outer periphery of the case plate portion while an inner peripheral wall of the case outer tubular portion is configured to contact an outer peripheral wall of the housing outer tubular portion.

4. The clutch actuator according to claim 1, wherein the housing includes a housing recess that is recessed from a surface of the housing plate portion, which is located on another side of the housing plate portion where the case plate portion is placed, toward the one side of the housing plate portion which is opposite to the case plate portion, while the housing recess is configured to receive at least a portion of the breathable filter.

5. The clutch actuator according to claim 1, wherein the case includes a case recess that is recessed from a surface of the case plate portion, which is located on one side of the case plate portion where the housing plate portion is placed, toward another side of the case plate portion which is opposite to the housing plate portion, while the case recess is configured to receive at least a portion of the breathable filter.

6. The clutch actuator according to claim 1, wherein the housing ventilation hole is placed along a ventilation path that communicates between an inside space of the housing and an outside space of the case.

7. The clutch actuator according to claim 1, wherein gas-tightness or liquid-tightness is maintained at each of:
an inside space of the housing; and
the outside space of the housing which is located in the inside space of the case.

8. The clutch actuator according to claim 1, comprising a seal member that is shaped in an annular form and is placed between the housing plate portion and the case plate portion at a location which is on a radially outer side of the housing ventilation hole in a view taken in a plate thickness direction of the housing plate portion, wherein the seal member is configured to maintain a gas-tight or liquid-tight seal between the housing plate portion and the case plate portion.

9. The clutch actuator according to claim 7, wherein:
the case is a transmission case that is configured to receive a transmission; and
in a state where the clutch actuator is placed in the inside space of the case, the outside space of the housing, which is located in the inside space of the case, is a transmission oil atmosphere.

10. The clutch actuator according to claim 7, wherein the rotation-to-translation converter includes:
- a drive cam that is shaped in an annular form and is configured to be rotated relative to the housing when the torque outputted from the electric motor is inputted to the drive cam;
- a driven cam that is configured to be moved relative to the housing in an axial direction when the drive cam is rotated relative to the housing; and
- at least one rolling element that is configured to be rolled between the drive cam and the driven cam;

the clutch actuator comprises at least one cam seal member which is placed between:
- an inner periphery and an outer periphery of one of the drive cam and the driven cam; and
- the housing; and the at least one cam seal member is configured to maintain a gas-tight or liquid-tight seal between the housing and the one of the drive cam and the driven cam.

11. The clutch actuator according to claim 10, wherein the at least one cam seal member is configured to maintain a gas-tight or liquid-tight seal between the receiving space and the outside space of the housing which is located in the inside space of the case.

* * * * *